G. HORNIACHEK.
WIND SHIELD CLEARING DEVICE.
APPLICATION FILED JAN. 18, 1915.

1,163,011.

Patented Dec. 7, 1915.
2 SHEETS—SHEET 1.

Witnesses
C. Gogolak
D. S. Bryant

Inventor
G. Horniachek

By
N. M. Wilson
Attorney

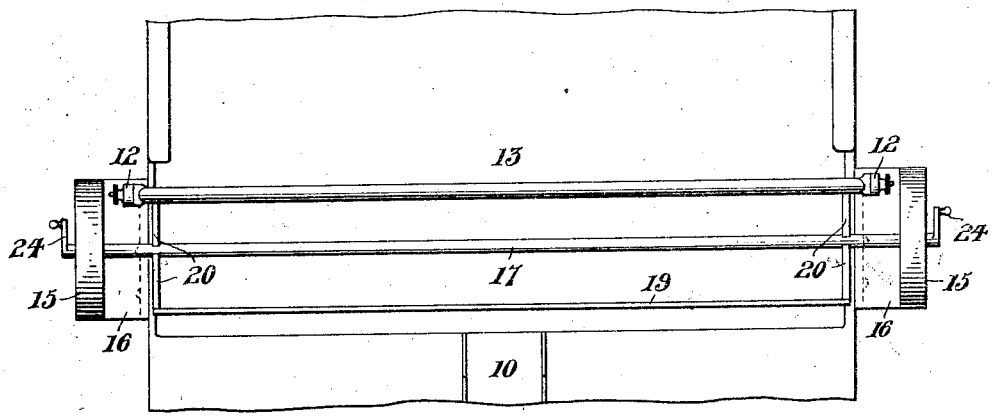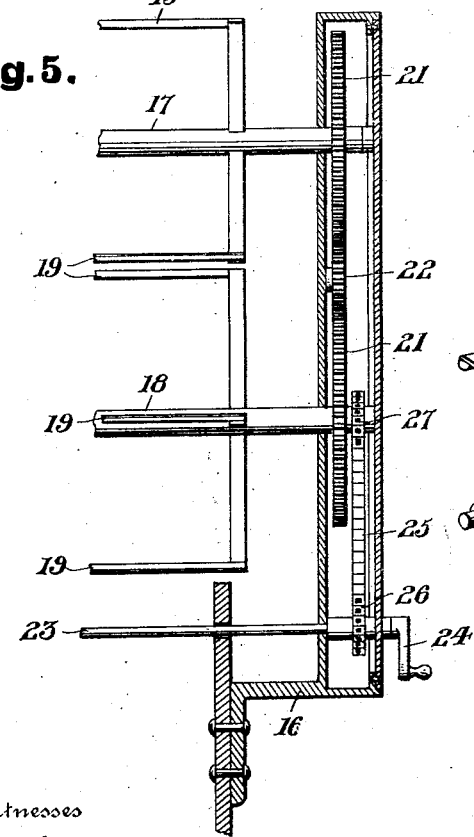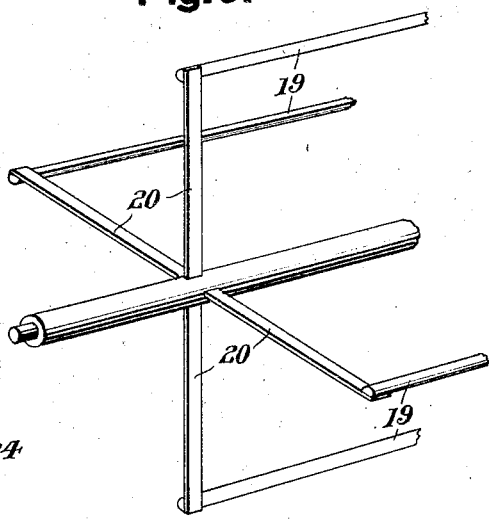

UNITED STATES PATENT OFFICE.

GEORGE HORNIACHEK, OF ROULEAU, SASKATCHEWAN, CANADA.

WIND-SHIELD-CLEARING DEVICE.

1,163,011.   Specification of Letters Patent.   Patented Dec. 7, 1915.

Application filed January 18, 1915. Serial No. 2,947.

*To all whom it may concern:*

Be it known that I, GEORGE HORNIACHEK, a subject of the Emperor of Austria-Hungary, residing at Rouleau, Saskatchewan, Canada, have invented certain new and useful Improvements in Wind-Shield-Clearing Devices, of which the following is a specification.

This invention relates to new and useful improvements in wind shield clearing device.

It is well known that the wind shield of an automobile often becomes obscure during a storm rendering vision difficult therethrough and thus occasioning accidents and the main object of the present invention is to provide a ready means whereby the exposed surface of the wind shield may be readily cleared for allowing free vision therethrough.

A further object is to provide a scraper or clearer relatively positioned with respect to the wind shield of an automobile and whereby the driver may readily actuate the device for clearing the wind shield of rain and snow and any foreign matter that may collect thereon.

A still further object is to provide a clearing means for the separate portions of a two part wind shield operable simultaneously by the turning of a crank positioned near the dash board of the vehicle and whereby substantially the entire exposed area of each shield portion is cleaned.

With these general objects in view and others that will appear as the nature of the invention is better understood, the same consists in the novel combination and arrangement of parts hereinafter fully described, illustrated in the accompanying drawings, and pointed out in the appended claims.

Figure 1:
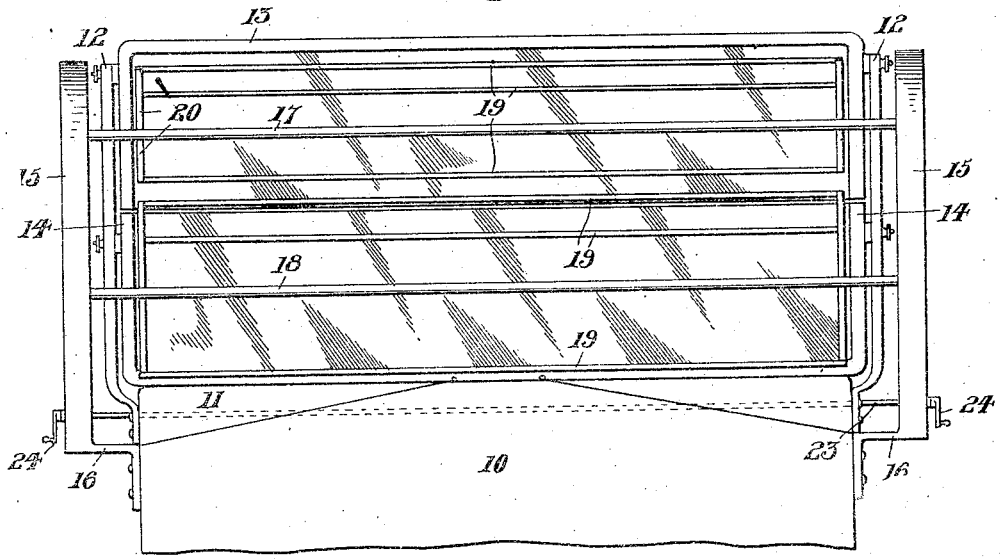
Figure 2:
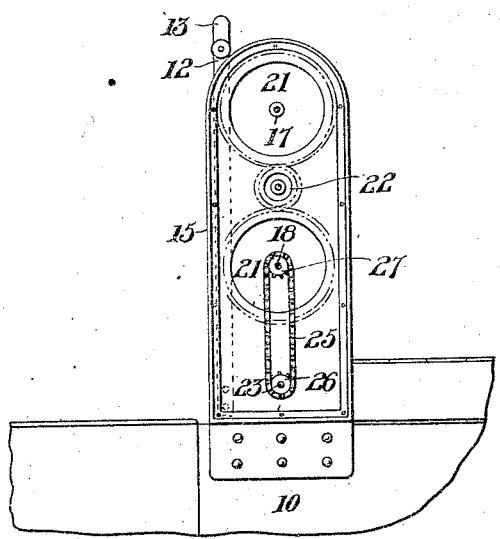
Figure 3:
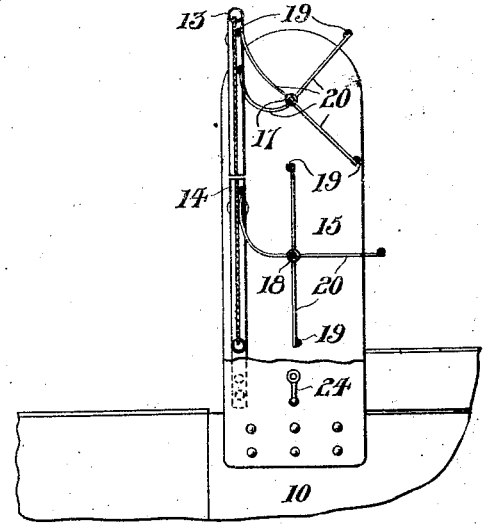

In the drawings forming a part of this application and in which like designating characters refer to corresponding parts throughout the several views: Figure 1 is a front elevation of a wind shield and the adjacent portion of an automobile with the invention installed thereon. Fig. 2 is a side elevation thereof with one of the casing plates removed. Fig. 3 is a side elevation thereof partly in vertical section. Fig. 4 is a top plan view of the same. Fig. 5 is a vertical transverse sectional view through one of the end casings and showing the adjacent portions of the device, and Fig. 6 is a perspective view of an end portion of one of the shield scrapers detached.

Referring more in detail to the drawings, the device is illustrated as installed upon an automobile 10 which has its wind shield secured to the dash board 11 by the opposite brackets 12, the upper and lower portions 13 and 14 respectively of the wind shield being journaled in the said brackets in the usual manner and as best illustrated in Fig. 1 of the drawings. Casings 15 are mounted upon the automobile at opposite points thereof and slightly in advance of the wind shield brackets 12 by means of securing irons 16 while an upper and a lower shaft 17 and 18 respectively, are journaled in the said casings 15, each being in a horizontal plane, substantially on a level with the central longitudinal axis of the adjacent wind shield portion. The said shafts 17 and 18 form part of scrapers or clearers for the adjacent shield portions being each provided with shield engaging strips 19 preferably formed of rubber and mounted upon the said shafts in spaced relations thereto by means of flexible spokes 20 radially arranged adjacent the opposite ends of the shafts. While it will be understood that any desired number of the scraping strips may be employed, four of the same are herein shown. The opposite ends of the shafts 17 and 18 project within the opposite casings 15 and each of the same is provided therein with a similar gear 21, the gears of each pair being operatively connected together by means of an intermediately positioned idler 22 which is in constant mesh with both of the said gears. An operating rod 23 is also journaled transversely of the casings 15 and has operating cranks 24 secured to its opposite ends while a sprocket chain 25 passes over similar sprocket wheels 26 and 27 fixed respectively, upon the rod 23 and shaft 18 and whereby the shaft 18 is revolved upon turning either one of the cranks 24.

From this detailed description of the device, the complete operation thereof will be at once apparent. Whenever the wind shield collects moisture, snow or other foreign matter upon its outer surface, the driver of the automobile may readily turn one of the operating cranks 24 without the necessity of alighting from the automobile and thereby, the two clearing devices will be revolved in the same direction against the wind shield portions, as best illustrated in Fig. 3 of the drawings. In this manner the wind shield may be completely cleared or scraped clean whenever desired and insuring better vision for the driver.

While the form of the invention herein shown and described is what is believed to be the preferable embodiment thereof, it is nevertheless to be understood that minor changes may be made in the form, proportion and details of construction without departing from the spirit and scope of the invention as set forth in the appended claims.

What I claim as new is:—

1. A device of the class described comprising in combination with a wind shield, oppositely positioned vertical casings mounted adjacent thereto, shafts journaled transversely through the said casings, simultaneously operating means for the said shafts, flexible spokes radially mounted upon the said shafts, and rubber scraper strips secured to the ends of the said spokes.

2. A device of the class described, comprising in combination with a two-part wind shield mounted upon an automobile, of opposite casings vertically positioned and secured to the automobile in advance of the wind shield, upper and lower parallel shafts journaled through the said casings in substantially the same horizontal plane as the longitudinal axes of the shield portions, flexibly mounted scraper strips carried by the said shafts in spaced relations thereto and having a path of movement in the normal plane of the adjacent shield portion, gears fixed to the said shafts within the said casings, an idler in constant mesh with both of the said gears, an operating rod journaled through the said casings, sprocket chain connections between the said rod and the adjacent one of the said shafts, and actuating cranks secured to the opposite projecting ends of the said rod.

In testimony whereof I affix my signature in presence of two witnesses.

GEORGE HORNIACHEK.

Witnesses:
M. M. DEANE,
R. S. DEANE.